Nov. 21, 1961  J. L. PENTECOST ET AL  3,009,692
HIGH TEMPERATURE FURNACE CONTROL APPARATUS
Filed Aug. 18, 1958  2 Sheets-Sheet 1

INVENTORS
JOSEPH L. PENTECOST
ZARR A. POST
PAUL E. RITT

BY *W. Robert Baylor*
ATTORNEY

INVENTORS.
JOSEPH L. PENTECOST
ZARR A. POST
PAUL E. RITT

BY *W. Robert Baylor*
ATTORNEY

United States Patent Office 3,009,692
Patented Nov. 21, 1961

3,009,692
HIGH TEMPERATURE FURNACE
CONTROL APPARATUS
Joseph L. Pentecost, Fairfax, Va., Zarr A. Post, Bethesda, Md., and Paul E. Ritt, Vienna, Va., assignors to Melpar, Inc., Falls Church, Va., a corporation of New York
Filed Aug. 18, 1958, Ser. No. 755,545
2 Claims. (Cl. 263—40)

The present invention relates to a high temperature furnace control system and more particularly to a high temperature furnace control system capable of maintaining precise control at extremely high temperatures.

Heretofore, the systems of controlling furnace temperature involved the control of the amount of heat input either by actual control of the fuel input or the rate of flow of the burning fuel through the furnace. Some of the disadvantages of the prior art systems are slow response of the furnace temperature to changes in fuel input; difficulty in controlling furnace atmosphere as fuel input is changed; and thermal gradients in furnace change as fuel input is varied.

The increased use of highly refractory materials, particularly in the missile and aircraft fields, has created a need for furnace apparatus which can maintain extremely high temperatures with reasonable accuracy. Sintering of materials such as pure oxides, sulfides, borides, nitrides, and carbides, often requires temperatures in the range from 3000° to 4500° F. Also, it is necessary to make electrical and physical measurements of the sintered samples or changes at temperatures above 3000° F. The nature of this work is such that temperature control to plus or minus 5° F. is desirable in both the sintering and testing operations. By keeping the working area of the furnace at a practical size, for example, one-third cubic foot, thermal gradients are greatly reduced; and through efficient insulation and control of radiation losses from the flue, control of the furnace temperature within the desired limits is achieved.

In accordance with the present invention, the principal object is to provide a simple yet sensitive and accurate means of controlling the high temperatures of a laboratory or commercial furnace.

Another object is to provide a high temperature furnace control system whereby it is possible to vary the atmosphere flow into the furnace, and as a result thereof, maintain a predetermined operative temperature condition.

A further object of the invention is the provision of a furnace control system in which the furnace temperature is sensed within plus or minus five degrees in a high temperature range, for example, 3000 to 4500 degrees Fahrenheit.

Still another object is to provide a high temperature furnace control system that includes an automatic shutter control which will operate in response to one or more variable conditions present in a furnace when combustion is occurring.

Another object is to provide a high temperature furnace control system that utilizes a motor driven shutter which is proportionally positioned so as to control radiation losses from the furnace chamber.

Still a further object of the present invention is the provision of a high temperature furnace control apparatus which is relatively simple to construct, economical to manufacture, and efficient in operation.

The need for non-porous multicrystalline oxide samples for the measurement of thermal conductivity and other physical properties prompted applicants to construct a furnace capable of reaching extremely high temperatures. Temperature requirements of above 3000° F. have prevented past operative use of the common refractories, fuels and burners.

Applicants have designed and constructed a high temperature furnace to fire refractory oxide samples to temperatures above 3000° F. The furnace, in the preferred form, is fired with oxygen and acetylene, using water-cooled burners. Stabilized zirconia refractories have been used in the construction of the firing chamber.

In accordance with the teachings of the present invention, an oxygen-acetylene fired rectangular furnace has been constructed with a zirconia lining capable of maintaining precise temperature control in a range from 3000° to 4500° F. The firing chamber presently in use is eleven inches long, seven inches wide and seven inches high, of which about half the volume is maintained at a uniform temperature. This can be enlarged if larger samples must be produced. Firing is accomplished by two oxygen-acetylene burners mounted on opposite sides of the eleven-inch dimension of the firing chamber. The flames impinge on zirconium oxide bricks upon which the samples rest in the center of the furnace. Various firing cycles can be attained although the temperature rises quite rapidly to 3000° F. and prefiring of the samples is necessary to prevent shattering.

The temperature control system utilizes a motor driven shutter which is proportionally positioned so as to control the radiation losses from the furnace rather than the fuel input. The temperature is sensed with a total radiation pyrometer, and can be controlled to plus or minus 5° F. at any temperature in the range 3000° to 4500° F.

One of the main features of the invention is the shutter member which may be moved to expose a portion of the interior of the furnace, or reduce the thermal insulation over a portion of the furnace. The shutter is arranged so that the opening or insulated area in the furnace wall is varied. For automatic control, the shutter is positioned with a position-proportional-control type instrument. Fuel input to the furnace is maintained at an essentially constant value during the high temperature period when control by the invention is effected. During the firing operation, this constant heat flow from the burners is maintained at a slightly higher temperature than the desired operative firing temperature. The higher input rate heat flow and the shutter-controlled opening provide in conjunction therewith a constant high temperature central atmospheric area which is the actual core of the rectangular chamber. The temperature of a charge thus positioned in the central area may be controlled to plus or minus 5° F. at any temperature in the 3000° to 4500° F. range.

Another feature of the invention is for the shutter-controlled opening to serve a dual purpose by being the passageway through which the charge is centrally positioned in the chamber. Consequently, the sole opening provides the only egress and ingress to the chamber during the firing operation.

Some of the advantages of the high temperature furnace control system disclosed herein are that temperatures above 3000° F. may be controlled with extreme accuracy due to rapid heat transfer by radiation; thermal gradients in the heated chamber can be minimized; and fuels which are difficult to premix and proportion may be used. Further, it is to be particularly pointed out that once the fuel is adjusted, the control of the temperature is achieved with the proportioning of the losses. Thus, the control system may be applied to a variety of high temperature furnaces.

Other objects, features and many of the attendant advantages of this invention will be readily appreciated as the same becomes better understood by reference to the following detailed description when considered in connection with the accompanying drawings in which like reference numerals designate like parts throughout the figures thereof and wherein.

Certain terms and words have been used herein merely for the purpose of convenience and not by way of limitation and it is to be understood that these terms are used generically without limiting the scope of the invention because of the use of the same and, therefore, the invention is to be construed accordingly.

Figure 1:
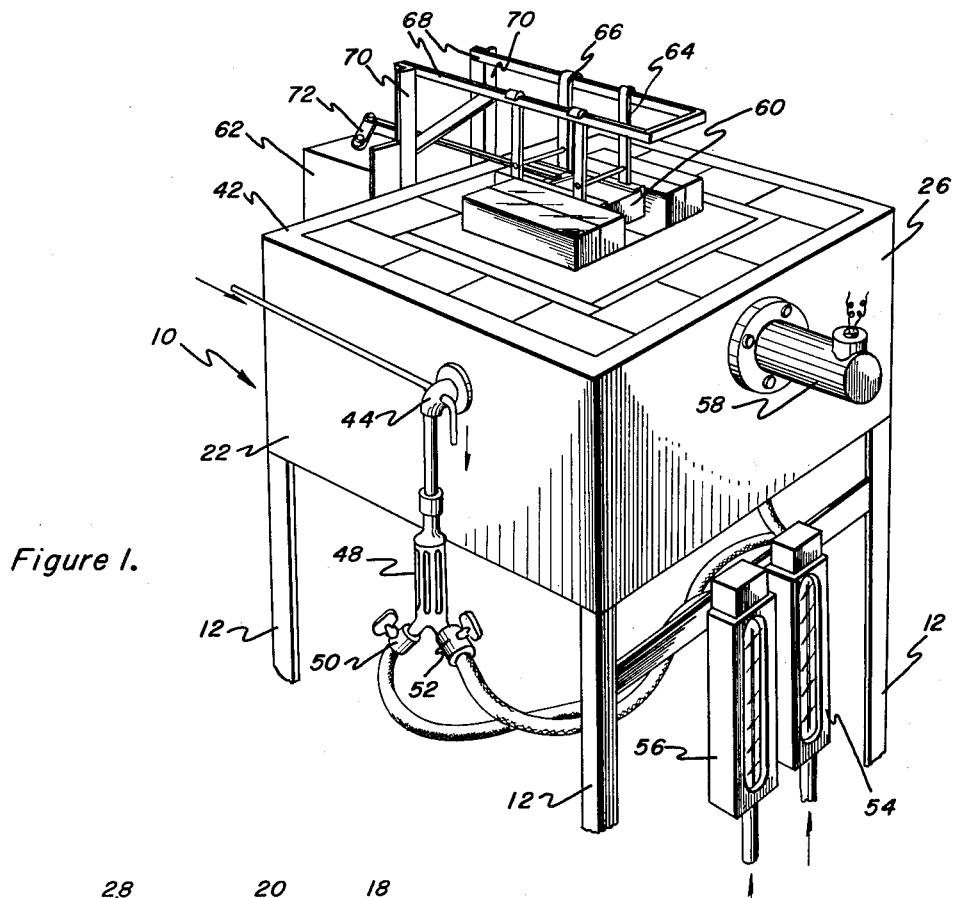
FIGURE 1 is a diagrammatic perspective view showing the furnace with various control means applied thereto.

Referring now to the drawings, wherein like reference characters designate like or corresponding parts through the several views there is shown in FIGURE 1, which illustrates a preferred embodiment, a rectangular furnace housing 10 mounted on a plurality of leg members 12 and showing the various control means associated with furnace 10.

Though of general application, the invention in its preferred form has the dimensions for the rectangular firing chamber 14 as eleven inches in length, seven inches in width, and seven inches in height. The reason for these dimensions will be described hereinafter in detail. The chamber 14 is provided with a zirconium oxide brick lining 16 because of its low thermal conductivity and high melting point. A 2-inch thick layer 18 of zirconia grain is provided between the lining 16 and the outer 2300° F. insulating refractory or firebrick 20 to insure that no reaction occurs between the zirconia inner lining 16 and the insulating refractory 20. Sixteen gauge steel panels with suitable angle irons constitute the outer structural sidewalls 22, 24, 26 and 28 of furnace 10.

Figure 2:
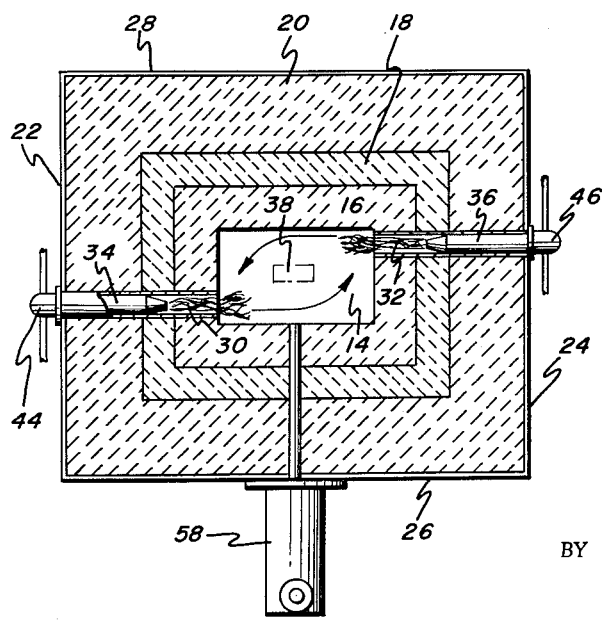
FIGURE 2 is a top sectional view of the furnace including the firing chamber, burners and an instrument for measuring high temperatures.
Figure 3:
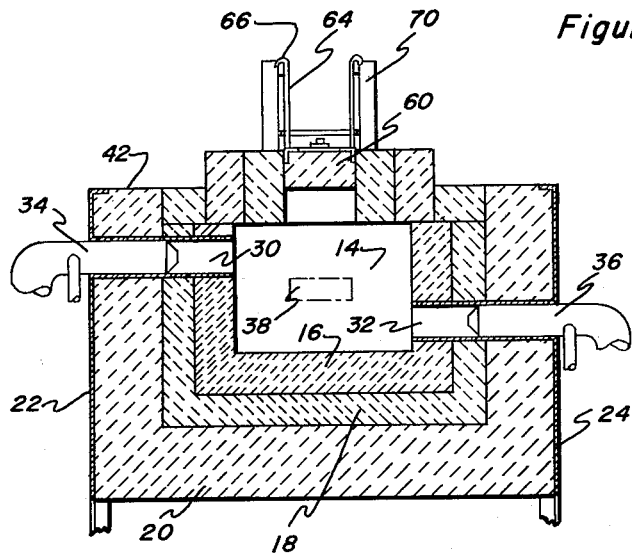
FIGURE 3 is a side sectional elevation view of the furnace including the movably mounted shutter in the top wall thereof.

In FIGURES 2 and 3, it is readily seen that elongated passageways 30 and 32 provide the housings for the burner assemblies 34 and 36. The passageways 30 and 32 extend from the outer sidewalls 22 and 24, respectively, to the oppositely opposed inner walls of chamber 14. Further, the passageways 30 and 32 are offset to each other in both the horizontal and vertical planes. The burners 34 and 36 are inserted in passageways 30 and 32 and are rigidly positioned therein. Each of the burners 34 and 36 is provided with a small multiple orifice tip which terminates a short distance from the walls of chamber 14. During the firing operation the charge 38 is admitted through an opening 40 in the top wall 42 of furnace 10. The importance of the opening 40 will be fully explained hereinafter in the description.

The charge 38 is placed in a central position in chamber 14. The flames of burners 34 and 36 travel in a circular path around the centrally positioned charge 38, as illustrated by the arrows in FIGURE 2. Thus, the offset relationship of burners 34 and 36 to each other in the vertical and horizontal planes, as seen in FIGURES 2 and 3, provides a rapid circulation of the burning fuel in chamber 14. Burners 34 and 36 including the multiple orifice tip portions have brass water jackets 44 and 46, respectively, silver-soldered thereto to prevent overheating. Water is circulated during the firing period and for a short time thereafter to cool the burners 34 and 36 to room temperature. These cooling water jackets extend the lives of the burners and prevent flash back of the premixed fuels due to overheating before leaving the burner orifices. In addition to making all burner connections gas tight, the burners 34 and 36 are structurally made as illustrated to reduce the chances of varying burner control due to frictional losses in the pipes.

Burners 34 and 36 have conventional torch handles 48 connected thereto and oxygen needle valves 50 and acetylene needle valves 52 operatively attached into torch handles 48 to make possible the sensitive adjustment of the flow of the respective fuels into the burners. In order to provide uninterrupted flow of both oxygen and acetylene, manifolds of five tanks (not shown) are provided for both gases. Such an arrangement provides about five hours of operation without attention. However, gas cylinders may be changed without interrupting the gas flow.

Theoretical flame temperature calculations indicate that the mixture of oxygen and acetylene burned in chamber 14 fires chamber 14 to 3000° F. and higher in an extremely short time. In addition, these fuels do not contaminate the pure oxide samples and are very clean to use. Further, the use of an oxygen-acetylene mixture produces one of the highest temperature flames of the readily available fuels.

Figure 4:
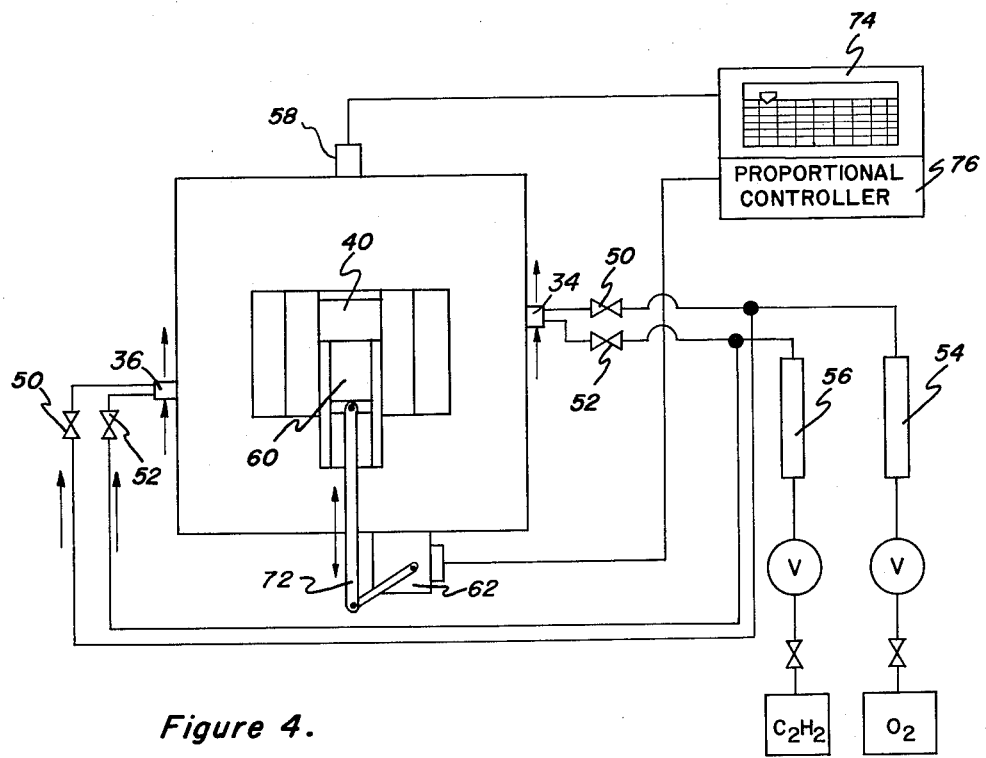
FIGURE 4 is a schematic view of the furnace system showing the location of the various control elements.

Flow meters 54 and 56 determine the total fuel flow and provide an oxygen-acetylene ratio for the atmosphere control in chamber 14. In the preferred embodiment, two float-type flow meters 0–6.775 cubic feet per minute for oxygen and 0–6.860 cubic feet per minute for acetylene are incorporated in the supply system. In FIGURE 4, the supply system is shown as the conventional type which includes tanks, valves, regulators and gauges.

In the foregoing description it has been assumed the furnace 10 has been in firing operation, and in the firing operation, it is not only necessary to attain some desired temperature but to do it in such a manner with respect to time that the chemical reactions in sample 38 can proceed to a desired end point. Applicants' system that includes sensitive oxygen and acetylene controls for furnace 10 make it possible to maintain soaking temperatures in the range of 3000° and 4500° F. to within plus or minus 5° F. as measured by total radiation pyrometer 58.

The temperature in chamber 14 is measured by radiation pyrometer 58 sighted into the area where samples 38 are usually placed. It is found desirable to cool the front lens of radiation pyrometer 58 with a small fan (not shown) to prevent inaccuracies arising from the slight heating of pyrometer 58. This cooling is necessary when temperatures above 3100° F. are held continuously. While a radiation pyrometer is preferred, it is to be understood that thermocouples or other temperature-responsive devices may be utilized.

In the present invention, another of the unique features of furnace 10 is the manner in which temperature control is effected. Slight changes in flue opening 40 of top wall 42 of furnace 10 change the temperature of chamber 14 rapidly at temperatures above 3000° F. Also, the use of a control system other than fuel input control is highly desirable from the safety standpoint, since premixing of oxygen and acetylene, and the proportioning of such a mixture is dangerous.

In accordance with the present invention, the charge 38 in chamber 14 is heated by the application of the circulated heat flow from the ejecting flames of burners 34 and 36 and in general, the heat flow is at a slightly higher temperature than the desired operating temperature in the range between 3000° to 4500° F. The flow of air to and from chamber 14 through flue opening 40 on upper wall 42 to the atmosphere outside chamber 14 is varied by regulating the cross-sectional area of opening 40. This regulation is accomplished by shutter 60 which is composed of a dense zirconia brick that has a plurality of vertical support members 64 attached thereto. The support members 64 extend upwardly from shutter 60 and their top edges 66 turn outwardly to slidably engage and suspend from a pair of parallel horizontal rails 68. Vertical bars 70 are attached to wall 28 of furnace 10 and to the ends of rails 68 to form the supporting structure as shown in FIGURE 1. The shutter 60 is operatively connected to a conventional proportioning motor 62, by a suitable linkage mechanism 72. The motor 62 through actuated linkage 72 provides a linear reciprocating motion to refractory shutter 60 to position same a desired incremental distance over flue opening 40.

The manner in which the foregoing operations are automatically carried out will now be set forth in more detail. The operation of the temperature control system is relatively easy to perform. If automatic control is desired, the firing temperature is set on controller-recorder 74, the proportional controller 76 is turned to automatic, and the fuel input is adjusted so that a slightly higher temperature than the desired operating temperature is achieved. The controller 76 automatically adjusts the flue opening 40 as the desired operative temperature is approached, and maintains the desired temperature by increasing or decreasing the flue opening 40 as required. If manual control is desired, the opening 40 may be adjusted with a control on the front of the controller 76. The temperature control is substantially entirely dependent on radiation losses from the furnace interior and hence rapid control response is obtained within a five degree range.

The controller-recorder 74 is a variable span recorder and can be manually set to give the desired temperature range at any point on the scale. While not necessary for routine work, this versatility allows controller-recorder 74 to be used for several different applications. The proportional controller 76 is a position-proportioning type and is used to energize motor 62. A motorized variable transformer, gas valve motor or other proportioning motor may be used in lieu of the described motor 62.

The temperature in chamber 14, as set forth hereinabove, is measured by radiation pyrometer 58 which is attached to wall 26 and sights into chamber 14. The pyrometer 58 is operatively connected to the controller-recorder 74 to record the furnace chamber temperature for the automatic or manual operation as above indicated.

Temperature variations inside the chamber 14 may be as important as the temperature control that is achieved. Some variation in the temperature at various points inside the gas-fired chamber 14 is inevitable. In chamber 14 when the burners 34 and 36 are allowed to impinge on charges 38 and are not baffled, hot spots several hundred degrees above the average temperature may be formed. However, this problem may be substantially eliminated by placing a baffle (not shown) several inches in front of burners 34 and 36 so that the flow of hot gases is broken up. The useful volume of chamber 14 in this modification is about a five inch cube, or about one-half of the total inside volume for the dimensions hereinabove recited. The use of baffles, together with the burner placement of being offset vertically and horizontally, assures uniform circulation of the hot gases in the chamber 14.

The oxygen-acetylene fired furnace 10 described herein is capable of maintaining a precise temperature from 3000° to 4500° F. The higher temperatures of this range are readily attainable, but shrinkage of the refractory lining 16 is somewhat of a problem above 4000° F. and reduced refractory life can be expected. Little difficulty is experienced with the fusion of lining 16, or with control of the temperature or the atmosphere in chamber 14. The use of temperatures above 3000° F. in sintering operations is entirely practical with furnace 10. Thus, applicants have constructed a furnace that provides a rapid and economical means for attaining high-temperature firing treatments to 4500° F. with optimum control of atmosphere and soaking conditions.

From the foregoing description, it is apparent that the present invention provides a new and improved anticipatory heat stabilizing system for substantially eliminating temperature fluctuations with a furnace. Consequently, the invention has wide applicability in the field of industrial heating processes where precise temperature control is essential or desirable.

While a specific embodiment of the invention has been shown and described, it is apparent that numerous variations and modifications may be made, and it is contemplated in the appended claims to cover all such modifications as fall within the true spirit and scope of the invention.

What is claimed is:

1. Apparatus for heating a charge in a substantially closed furnace chamber to an operative firing temperature in a range from 3000° to 4500° F. comprising a furnace chamber having a plurality of burners for injecting gaseous fluid into said chamber, said burners being spaced in a staggered relationship to each other to provide a uniform circulation of the gaseous fluid around the charge positioned centrally in said chamber; means for establishing and automatically maintaining the fluid input at a substantially constant value during the firing operation; a single opening on the upper wall of said chamber; shutter means positioned and arranged to regulate the area of said opening; and thermo-responsive means operatively connected to said chamber and said shutter means, said thermo-responsive means closing said shutter means when the furnace temperature is decreased an incremental amount and opening said shutter means when the furnace temperature is increased an incremental amount.

2. Apparatus for heating a charge in a substantially closed furnace chamber comprising a furnace chamber having burner means for injecting gaseous fluid into said chamber, said burner means being spaced in a staggered relationship to each other to provide a uniform circulation of the gaseous fluid around the charge positioned centrally in said chamber; means for establishing and automatically maintaining the fluid input at a substantially constant value during the firing operation; opening means on a wall of said chamber; shutter means positioned and arranged to regulate the area of said opening means; and thermo-responsive means operatively connected to said chamber and said shutter means, said thermo-responsive means closing said shutter means when the furnace temperature is decreased an incremental amount and opening said shutter means when the furnace temperature is increased an incremental amount.

References Cited in the file of this patent

UNITED STATES PATENTS

| 1,039,801 | Quigley | Oct. 1, 1912 |
| 1,961,894 | Wadman et al. | June 5, 1934 |
| 2,277,595 | Levy et al. | Mar. 24, 1942 |
| 2,303,901 | Baker | Dec. 1, 1942 |
| 2,370,897 | Whitcomb | Mar. 6, 1945 |
| 2,837,917 | Machler | June 10, 1958 |

FOREIGN PATENTS

| 487,347 | France | June 25, 1918 |

OTHER REFERENCES

Page 421 of Modern Furnace Technology by H. Etherington. Published 1938 by Charles Griffin and Co., 42 Drury Lane, WC2, London England.